US012066793B2

(12) United States Patent
Matthey

(10) Patent No.: US 12,066,793 B2
(45) Date of Patent: Aug. 20, 2024

(54) METHOD FOR MANUFACTURING A PLURALITY OF GENERATORS ADAPTED FOR A HOROLOGICAL APPLICATION

(71) Applicant: The Swatch Group Research and Development Ltd, Marin (CH)

(72) Inventor: Olivier Matthey, Mauborget (CH)

(73) Assignee: The Swatch Group Research and Development Ltd, Marin (CH)

( * ) Notice: Subject to any disclaimer, the term of this patent is extended or adjusted under 35 U.S.C. 154(b) by 547 days.

(21) Appl. No.: 17/408,546

(22) Filed: Aug. 23, 2021

(65) Prior Publication Data
US 2022/0113683 A1    Apr. 14, 2022

(30) Foreign Application Priority Data

Oct. 8, 2020 (EP) .................................... 20200800

(51) Int. Cl.
G04C 10/00 (2006.01)
G04C 3/00 (2006.01)
G04C 3/16 (2006.01)

(52) U.S. Cl.
CPC ............. *G04C 10/00* (2013.01); *G04C 3/008* (2013.01); *G04C 3/16* (2013.01); *Y10T 29/49012* (2015.01)

(58) Field of Classification Search
CPC ........ G04C 10/00; G04C 3/008; G04C 13/11; H02K 15/00; H02K 37/10; Y10T 29/49012

(Continued)

(56) References Cited

U.S. PATENT DOCUMENTS 5,734,215 A    3/1998 Taghezout et al.
6,124,649 A    9/2000 Schafroth
(Continued)

FOREIGN PATENT DOCUMENTS

CN    1148752 A    4/1997
CN    108141085 A    6/2018
(Continued)

OTHER PUBLICATIONS

Combined Chinese Office Action and Search Report issued Sep. 18, 2023 in Chinese Patent Application No. 202111054843.6, 6 pages.
(Continued)

*Primary Examiner* — Thiem D Phan
(74) *Attorney, Agent, or Firm* — Oblon, McClelland, Maier & Neustadt, L.L.P.

(57) ABSTRACT

A method for manufacturing a plurality of generators, each intended to power supply an electronic circuit operating in a given power supply voltage range, includes a step of manufacturing coils distributed in N pluralities of coils, similar within the same plurality and different from one plurality to another, and a step of manufacturing a plurality of rotors which is carried out with tolerances limiting the cost of production. The plurality of rotors is classified into N classes of rotors which are associated respectively with the N pluralities of coils to form N pairs allowing the assembly of N groups of generators. The generators of each of the N groups of generators have magnetic coupling factors between their rotor and their stator which are located in a corresponding optimised value range, which is at least partially superimposed on the others of the N optimised value ranges relating to the N generator groups.

4 Claims, 2 Drawing Sheets

(58) Field of Classification Search
USPC .................................... 29/598, 596, 605, 607
See application file for complete search history.

(56) References Cited

U.S. PATENT DOCUMENTS

| | | | |
|---|---|---|---|
| 6,469,959 | B1 | 10/2002 | Born |
| 6,570,824 | B1 * | 5/2003 | Born ...................... H02K 21/12 |
| | | | 368/64 |
| 7,948,124 | B1 * | 5/2011 | Waters ................... H02K 35/00 |
| | | | 310/36 |
| 2004/0109390 | A1 | 6/2004 | Born |

FOREIGN PATENT DOCUMENTS

| | | |
|---|---|---|
| CN | 109388055 A | 2/2019 |
| CN | 111293853 A | 6/2020 |
| EP | 1 109 082 A1 | 6/2001 |
| JP | 2012-18080 A | 1/2012 |

OTHER PUBLICATIONS

European Search Report issued Feb. 25, 2021 in European Application 20200800.9, filed on Oct. 8, 2020 (with English Translation of Categories of cited documents), 3 pages.

* cited by examiner

METHOD FOR MANUFACTURING A PLURALITY OF GENERATORS ADAPTED FOR A HOROLOGICAL APPLICATION

CROSS-REFERENCE TO RELATED APPLICATION

This application claims priority to European Patent Application No. 20200800.9 filed on Oct. 8, 2020, the entire disclosure of which is hereby incorporated herein by reference.

TECHNICAL FIELD

The invention relates to the manufacture of a plurality of generators wherein the rotor is provided with at least one permanent magnet and the stator comprises at least one coil, the rotor and the stator being arranged so as to allow a magnetic coupling which induces at least at each revolution of the rotor a voltage induced in said at least one coil.

TECHNOLOGICAL BACKGROUND

A permanent magnet generator incorporated into a timepiece is used to generate electrical energy via an induced voltage and an induced current in the stator coil(s). The induced voltage is generally rectified, optionally multiplied by a voltage booster and applied to a power supply capacitor which outputs a power supply voltage $U_{suppl}$ for an electronic circuit of the timepiece.

A clock-type generator, the stator of which is provided with three coils angularly offset by 120° is described for example in patent application EP 1 109 082. A clock-type generator, advantageously arranged, with a stator with two coils, is described in patent application EP 3 438 763. These two generators have a rotor pinion allowing a mechanism, comprising a barrel and a geartrain driven by the barrel, to rotate the generator. In particular embodiments, the speed of rotation of the generator is regulated to rotate on average at a given setpoint speed and the mechanism forms a mechanical movement provided with an analogue time display. The generator therefore has the dual function of regulating the operation of the mechanism to display the time accurately and of power supplying the electronic regulation circuit.

SUMMARY OF THE INVENTION

The inventor has brought to light a general problem in connection with timepieces comprising a generator and a source of mechanical energy intended to drive this generator. This general problem stems from two antagonistic elements: On the one hand, the power reserve of such timepieces and, on the other hand, the cost of manufacturing these timepieces. To increase the power reserve of a timepiece of the type in question, it is necessary to reduce the power consumed by the mechanism and the generator and also the electric power consumed by the electronic regulation circuit which operates normally within a determined power supply voltage range. Thus, to reduce the electrical power consumed, it is necessary to provide a power supply voltage which is as close as possible to a minimum voltage of the aforementioned power supply voltage range while remaining above the minimum voltage. However, to ensure that the power supply voltage is then not less than the minimum voltage, it is necessary to provide tight manufacturing tolerances for the production of a plurality of generators intended for a horological application. However, imposing tight manufacturing tolerances for the generators, in particular for the rotors of such generators, increases the manufacturing price of these generators significantly and therefore the production cost of the timepieces in question. It therefore seems a priori that it is necessary to choose between a higher power reserve and a relatively low production cost.

The purpose of the present invention is to provide a plurality of permanent magnet generators, configured for a horological application wherein each generator is rotated by a mechanism which is driven by a source of mechanical energy and where each generator power supplies an electronic circuit operating in a given power supply voltage range, which allow to consume relatively little electrical power for a given horological application, and thus to have a relatively high power reserve for the intended energy source, while having production costs of the plurality of generators which remain relatively low, in particular thanks to the manufacturing tolerances of the rotors of the generators which are relatively large.

To this end, the invention relates to a method for manufacturing a plurality of generators which comprises a step of manufacturing coils, a step of manufacturing rotors, and then a step of assembling a plurality of stators, each formed of a given number of coils manufactured during the step of manufacturing coils, respectively with a plurality of rotors, manufactured during the step of manufacturing rotors, to obtain the plurality of generators. The step of manufacturing rotors is carried out, with given tolerances, on the basis of data defining a reference rotor. The step of manufacturing coils comprises manufacturing N pluralities of coils, similar within the same plurality and different from one plurality to another, N being an integer greater than one (N>1). Before the step of assembling the plurality of stators with the plurality of rotors a step of classifying these rotors into N classes of rotors is carried out, the rotors of each of the N classes of rotors being selected so that they have a magnetic coupling factor with a reference stator, formed with the given number of reference coils placed in a reference configuration relative to each rotor, which is located within a continuous classification value range, which is not superimposed on the continuous classification value ranges of other rotor classes. Then, the N pluralities of coils are associated respectively with the N classes of rotors, thus forming N 'plurality of coils and associated class of rotors' pairs, so that the rotors of each class of rotors each have a magnetic coupling factor with a corresponding stator, formed of said given number of coils of the plurality of coils associated with the considered class of rotors, which is located in an optimised value range among N optimised value ranges relating respectively to the N pairs, each of the N optimised value ranges being at least partially superimposed with another of these N optimised value ranges; so that a minimum value of the N optimised value ranges is greater than a minimum value of said N continuous classification value ranges and that a maximum value of these N optimised value ranges is less than a maximum value of the N continuous classification value ranges; and so that the N optimised value ranges lie within a range of values specific for the magnetic coupling factor which corresponds to a given power supply voltage range for the horological application intended for the plurality of generators. The assembly step is finally carried out by assembling the rotors of each class of rotors with a stator formed by said given number of coils of the associated plurality of coils with which this class of rotors forms one of said N pairs.

According to a preferred embodiment of the invention, the N pluralities of coils are provided and the N 'plurality of coils and associated class of rotors' pairs are formed so that each of the N optimised value ranges is at least partially superimposed with every other optimised value range.

BRIEF DESCRIPTION OF THE FIGURES

The invention will be described in more detail below using the appended drawings, given by way of non-limiting examples, wherein.

DETAILED DESCRIPTION OF THE INVENTION

With reference to the figures, an embodiment of the method for manufacturing a plurality of generators according to the invention will be described.

Figure 1:
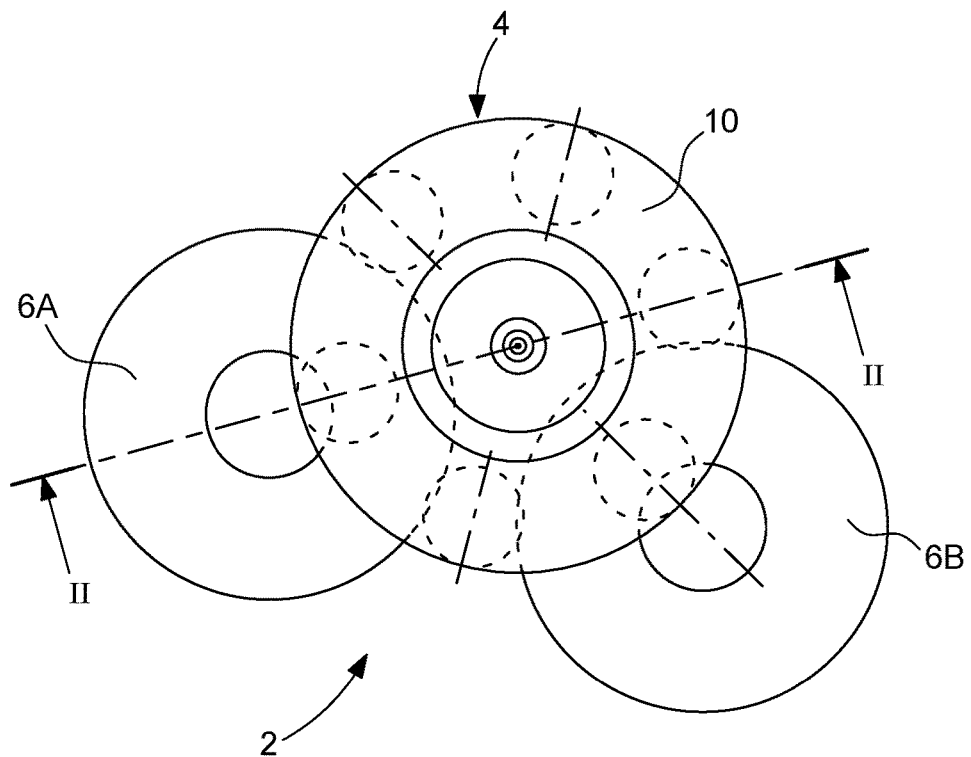
FIG. 1 is a top view of a clock-type generator, according to a particular embodiment, obtainable by the method for manufacturing a plurality of generators according to one embodiment of the invention.
Figure 2:
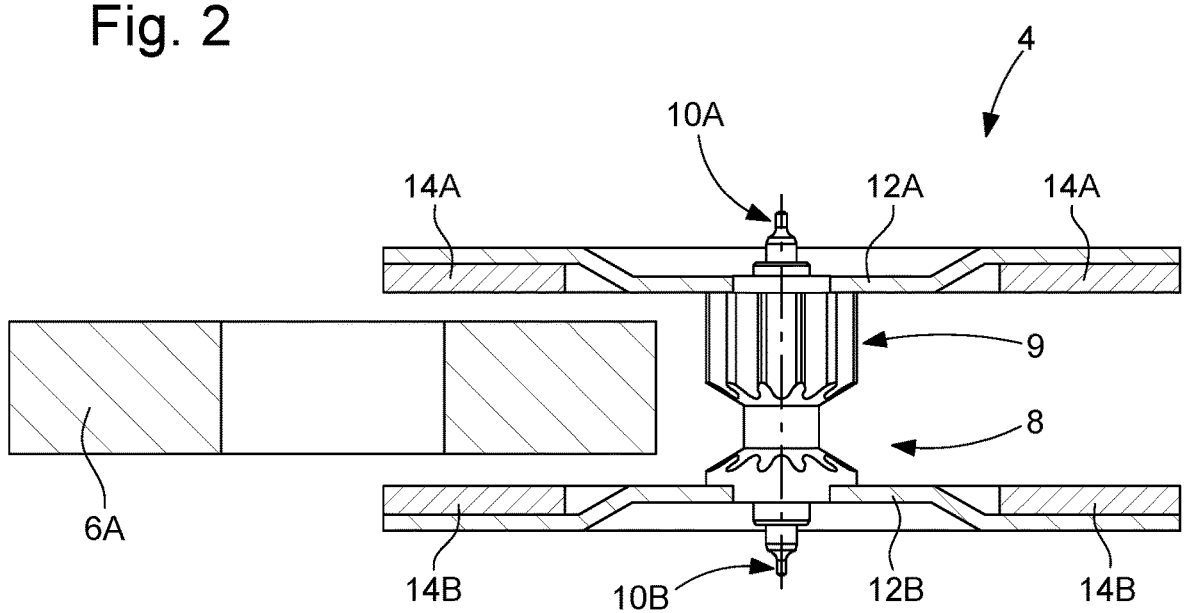
FIG. 2 is a cross section, along the line 'II-II', of the generator of FIG. 1.

An embodiment of a clock-type generator is shown in FIGS. 1 and 2. This generator 2 comprises a rotor 4 and a stator formed of two identical coils 6A and 6B. The coils are flat annular coils without cores. Alternatively, each coil has an outer diameter comprised between 3.5 mm and 5.0 mm, an inner diameter of approximately 1.0 mm, and a thickness comprised between 0.7 mm and 1.0 mm. With an electric wire diameter less than 20 microns, the number of turns of the electric wire is comprised between 4'000 and 6'000 turns. It should be noted that current manufacturing techniques allow to easily manufacture a plurality of identical coils (that is to say similar since small dimensional variations may however appear in a batch of coils manufactured to the same specifications). The diameter of the electric wire can be selected precisely and the number of turns of this wire can be provided to be constant using a simple electronic control managing the manufacture of a plurality of coils.

The rotor 4 is formed of a shaft 8 and two flanges 12A and 12B each carrying six permanent magnets 14A, respectively 14B. The magnets are arranged in the space between the two flanges with axial magnetisation and the same polarity. The shaft 8 carries an internal pinion 9 located between the two flanges and designed to mesh with a multiplication wheel of the watch mechanism (not shown) into which the generator is incorporated. This watch mechanism comprises an analogue time display which is driven by a geartrain in turn driven by a barrel, forming a source of on-board mechanical energy, and in kinematic relation with the generator which regulates the operation of the mechanism, namely the geartrain and the analogue display, via an electronic regulation circuit (not shown) associated with the generator, this electronic circuit regulating the speed of rotation of the generator by braking pulses applied to the generator so that its average speed is equal to a setpoint speed provided for an indication of the time without time drift. The shaft 8 conventionally comprises two pivots 10A and 10B which are inserted in two respective bearings to pivot the rotor. It will be noted that the permanent magnets can have another shape, in particular an oval shape. In a specific variant, the six permanent magnets carried by a flange are contiguous, with a profile defining an annular sector, and thus together form a magnetic ring. In another variant, the six magnets are formed by a one-piece magnetic ring (formed integrally) which is magnetised so as to form, on the side of a general median plane wherein the two coils 6A and 6B extend, six magnetic poles alternating with a magnetic flux leaving the annular magnet mainly in an axial direction. In such case this is about a multipolar magnet, that is to say a magnet having on one of its faces (or on its side surface) several magnetic poles. It will also be noted that the number of bipolar magnets or magnetic poles on the side of said general plane may be an even number other than six, for example eight. In an alternative embodiment with flanges made of magnetic material, only one of the two flanges carries magnets, the other flange then serving only for closing the magnetic fluxes generated by the magnets.

The manufacture of the rotor, in particular given the small dimensions of the permanent magnets 14A and 14B, is relatively difficult to meet predetermined specifications with tight tolerances. Indeed, several parameters can vary cumulatively, so that the magnetic coupling factor of a plurality of rotors, manufactured according to the same specifications, with a reference stator formed of two reference coils placed in a reference configuration relatively at each rotor, can extend over a relatively wide range of values, unless low tolerances are provided which generate a high production cost, in particular because of a number of permanent magnets and also of flanges provided with such magnets which must then be eliminated because ultimately outside the tolerances provided. Indeed, the magnetic coupling factor $K_u$ can vary in particular according to:—the geometric tolerances of the magnet (height, diameter),—the variation of the magnetic field Br of the permanent magnets depending on the production batches,—the tolerance for the positioning of the magnets on each of the two flanges,—the tolerance for the axial positioning of the magnets,—the tolerance for the parallelism of the two flanges carrying the magnets.

Figure 3:
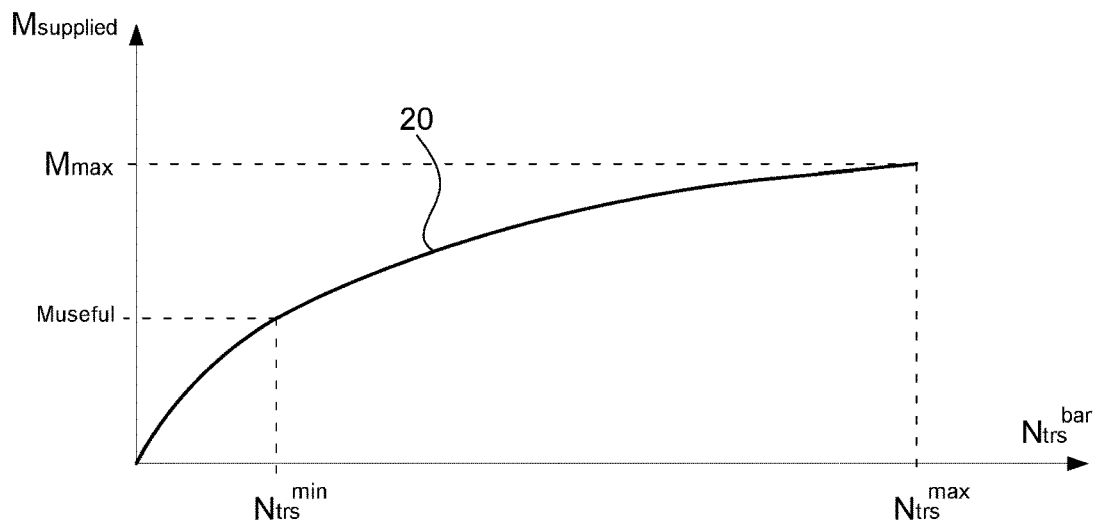
FIG. 3 shows a curve of a force torque provided by a barrel incorporated in a timepiece comprising a generator rotated by a mechanism driven by this barrel.

FIG. 3 shows a curve 20 giving the force torque $M_{supplied}$ which is supplied by a barrel according to its winding level. In a known manner, the force torque supplied by a barrel depends on its winding level and therefore on the relative number of turns $N_{trs}^{bar}$ between the shaft and the drum of the barrel, called the 'number of winding turns', from an unwinding angular position where the barrel spring is relaxed. The maximum force torque $M_{max}$ is naturally provided for a maximum number of winding turns $N_{trs}^{max}$. When the barrel spring relaxes and thus the barrel is unwound, the force torque supplied by the barrel decreases until reaching a useful force torque $M_{useful}$, corresponding to a certain remaining number of winding turns $N_{trs}^{min}$, which is the force torque necessary to ensure the correct operation of the timepiece, in particular of the generator 2 and of the mechanism which is associated therewith and which kinematically connects the barrel and this generator. It is important to realise that the smaller the useful force torque, the greater the number of useful winding turns, that is to say '$N_{trs}^{max} - N_{trs}^{min}$', and therefore, for a time indication mechanism, the greater the power reserve since the barrel rotates at constant speed in normal operation. Having the greatest power reserve for a timepiece, in particular of the type with an on-board mechanical energy source (barrel), is a main purpose for the manufacturer of such a timepiece, because this generally corresponds to the wish of the consumer. Starting from the fact that the useful force torque for the mechanism is determined and optimised separately, it is therefore possible to focus more specifically on the useful force torque which is necessary to ensure the operation of the assembly formed by the generator and the electronic regulation circuit associated with this generator. Thus, to increase the power reserve of the timepiece incorporating said assembly, it is advantageous to minimise the useful force torque for this assembly. As the useful power $P_{useful}$ is equal by definition to the useful force torque multiplied by the speed of rotation of the rotor of the generator, minimising the useful power, for a speed of rotation equal to a setpoint speed, is equivalent to minimising the useful force torque $M_{useful}$. The useful power $P_{useful}$ for the assembly 'generator and electronic regulation circuit of this generator' is given by the following mathematical formula:

$$P_{useful} = P_{mec} + P_{IC} + P_{coil}$$

The mechanical power $P_{mec}$ to maintain the generator at a constant speed of rotation depends essentially on the dry and viscous friction of the rotor of this generator. It is therefore sought to minimise this friction in order to increase the power reserve of the timepiece. The electrical power $P_{coil}$ consumed in the coils depends on the electrical resistance of these coils and on the electrical current flowing therein. Optimising the electrical resistance of the coils, taking into account in particular the size of the coils and the magnetic coupling with the rotor magnets which is necessary to be able to produce a sufficiently high power supply voltage and current is also advantageous for the power reserve. Finally, the power reserve of the timepiece can be increased by reducing the electrical power $P_{IC}$ consumed by the electronic regulation circuit. The present invention relates to the latter aspect. The problem related to the electric power $P_{IC}$ solved by the present invention does not relate to the manufacture of the electronic regulation circuit, which will be advantageously chosen for its features of low electrical consumption, but relates to the manufacture of a plurality of generators, according to given specifications, which can all provide a sufficient power supply voltage but as low as possible so that the electronic regulation circuit associated with each of these generators can be correctly supplied while consuming relatively little electric power.

Figure 4:
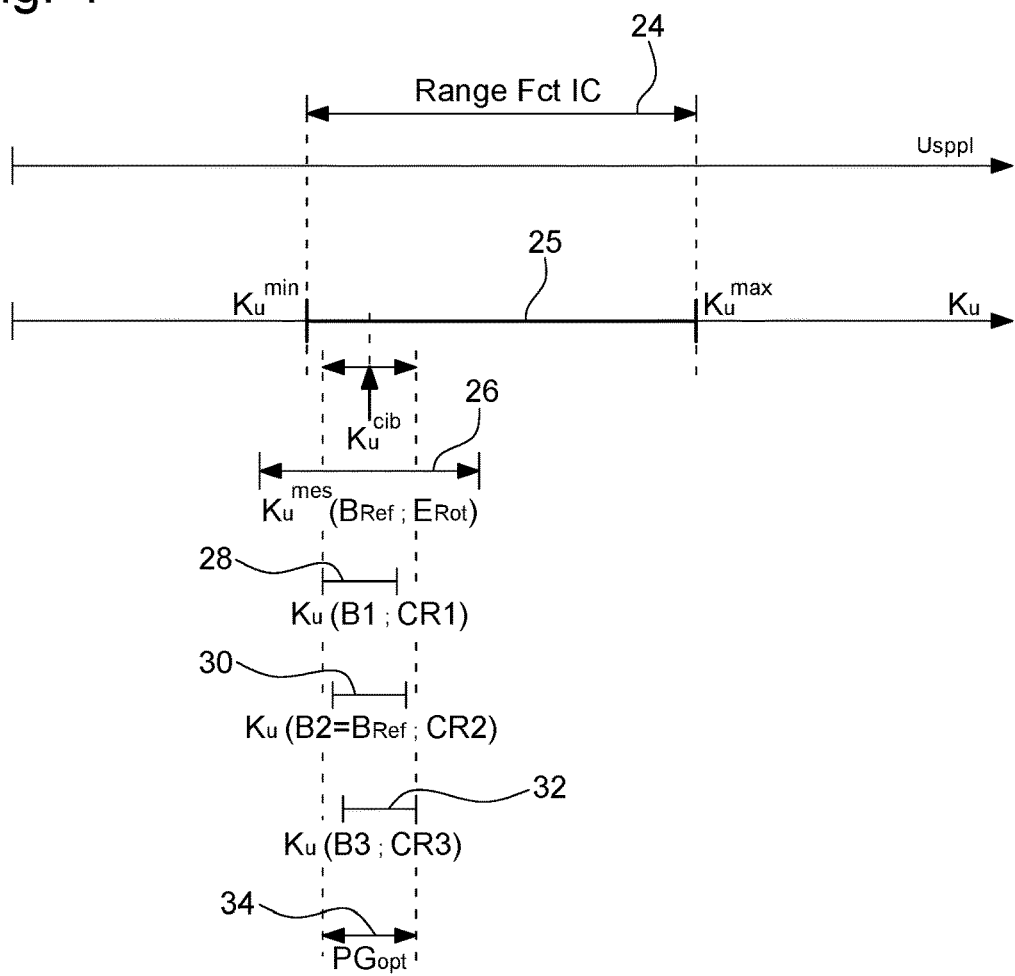
FIG. 4 shows the functional voltage range for an electronic regulation circuit power supplied by the generator of the timepiece considered in FIG. 3 and the three ranges of values optimised for the magnetic coupling factor of three 'plurality of coils and associated class of rotors' pairs provided in a variant of the considered embodiment of the invention.

The electrical power $P_{IC}$, consumed by the electronic circuit power supplied by the generator, is given by the following mathematical formula:

$$P_{IC} = U_{suppl} \cdot I_{IC} = g \cdot U_{ind} \cdot I_{IC}$$

where g is the multiplying factor of a voltage booster advantageously provided and $U_{ind}$ is the voltage induced in the coils of the generator and rectified, that is to say the voltage supplied at the input of the voltage booster which is connected at the output to a power supply capacitance providing the power supply voltage $U_{suppl}$. The induced voltage $U_{ind}$ is equal to the magnetic coupling factor $K_u$, intervening between the magnets of the rotor and the coils of the stator of the generator, multiplied by the speed of rotation $\omega_g$ (given in radians per second) of the rotor, that is to say $U_{ind} = K_u \cdot \omega_g$. As shown in FIG. 4, the electronic regulation circuit is generally arranged so as to be able to operate correctly with a power supply voltage $U_{suppl}$ located in an operating range 24, that is to say between a minimum power supply voltage $U_{suppl}^{min}$ and a maximum power supply voltage. Since the power supply voltage $U_{suppl}$ depends on the magnetic coupling factor $K_u$ ($U_{suppl} = g \cdot U_{ind} = g \cdot K_u \cdot \omega_g$), the electronic circuit can therefore operate correctly when the magnetic coupling factor $K_u$ between the rotor and the stator of the associated generator is located in a corresponding range of values 25 (in the variant described here, the speed of rotation is constant and $U_{suppl}$ is proportional to $K_u$).

As previously indicated, the cost of producing a plurality of watch-type generators depends significantly on the manufacturing tolerances provided for the manufacture of a plurality of rotors to form that plurality of generators. Thus, to minimise the cost of production, the person skilled in the art will consider providing relatively large manufacturing tolerances for the plurality of rotors taking as the target value for the magnetic coupling factor $K_u$ of a reference rotor (defined by data provided by a specification established for the rotor of the planned generator) a value far from the minimum value $K_u^{min}$ and also from the maximum value $K_u^{max}$, and therefore a value close to the middle of the range of values 25 relating to the magnetic coupling factor, so that the Gaussian curve giving the distribution of the magnetic coupling factor for the plurality of generators manufactured at relatively low cost lies essentially within this range of values 25 which is relatively wide. It follows from such an approach that the majority of the plurality of electronic circuits respectively associated with the plurality of generators will consume relatively a lot of electrical power, that is to say that the value of the electrical power $P_{IC}$ for the majority of the electronic circuits will be much greater than a minimum value $P_{IC}^{min} = U_{suppl}^{min} \cdot I_{IC} = g \cdot K_u^{min} \cdot \omega_g \cdot I_{IC}$ allowing to correctly power supply such an electronic circuit. Therefore, it results from this approach to reduce the production cost of generators that the majority of timepieces equipped with these generators will have a reduced power reserve by a consumption of their electronic regulation circuit much greater than a minimum consumption sufficient for the operation of such an electronic circuit and therefore by excessive power consumption.

To solve this problem, provision is made, according to a variant of the invention described with reference to FIG. 4, of a method for manufacturing a plurality of permanent magnet clock-type generators 2 comprising a step of manufacturing coils, a step of manufacturing rotors, and then a step of assembling a plurality of stators, each formed of two coils 6A, 6B manufactured during the step of manufacturing coils, respectively with a plurality of rotors 4, manufactured during the step of manufacturing rotors, to obtain the plurality of generators. The step of manufacturing rotors is carried out, with given tolerances, on the basis of data defining a reference rotor according to specifications relating to the planned generators. The step of manufacturing coils comprises manufacturing three pluralities of coils B1, B2 and B3, which are similar within the same plurality and different from one plurality to another. In an advantageous variant, the three coils B1, B2 and B3 differ only in the number of turns of the electric wire constituting these coils.

Before the step of assembling the plurality of stators with the plurality of rotors, a step of classifying the plurality of rotors into three classes of rotors CR1, CR2 and CR3 is carried out. For this purpose, the rotors are brought to a test station wherein each rotor is momentarily assembled with a reference stator to perform a measurement of the magnetic coupling factor of the test generator thus formed momentarily for the measurement. The reference stator is formed by two reference coils $B_{Ref}$ which are placed in a reference configuration relative to each rotor tested to form a test generator. To measure the magnetic coupling factor, the rotor of each test generator is rotated, for example by means of an air jet tangential to the axis of rotation of the rotor. Then by measuring the speed of rotation of the rotor and the voltage induced in the reference stator, it is thus possible to calculate a value of the magnetic coupling factor for the test generator considered and to associate this measured value with the tested rotor. To limit the cost of producing the plurality of generators, the magnetic coupling factor $K_u$ of the plurality of rotors with the reference stator, arranged in the reference configuration relative to each rotor in the test station, extends within a relatively wide range of values 26 because the rotors are manufactured with fairly large tolerances. This range of values 26 is therefore a range of measured values $K_u^{meas}$ ($B_{Ref}$, $E_{Rot}$) for the plurality of rotors $E_{Rot}$ with a reference stator formed of two reference coils $B_{Ref}$.

The classification of the rotors R1, R2 and R3 respectively into the three classes of rotors CR1, CR2 and CR3 is carried out by dividing the range of measured values $K_u^{meas}$ (range of values 26) into three continuous classification parts which are not superimposed. These three continuous parts are intended to be contiguous and cover the entire range of values 26 to encompass the plurality of rotors. The three continuous classification parts preferably have substantially the same length since the relations which occur in the mathematical formulas given above are linear relations. Since the present invention which allows to select a target value $K_u^{tar}$ for the magnetic coupling factor of a reference generator, formed of a reference stator and a reference rotor (according to the planned specifications), which is relatively close to the minimum value $K_u^{min}$, as will be easily understood later, it will be noted that the range of values 26 has a part whose values are less than this minimum value and which therefore correspond, for a reference stator, to values which are non-functional and therefore not 'authorised'.

Then, the three pluralities of coils, that is to say the first plurality of coils B1, the second plurality of coils B2, and the third plurality of coils B3, are respectively associated with the three classes of rotors CR1, CR2, CR3 (thus forming three 'plurality of coils and associated class of rotors' pairs) so that the rotors of each class of rotors have magnetic coupling factors $K_u$ with a corresponding stator, formed of two coils of the plurality of coils associated with the considered class of rotors, which are located within an optimised value range relative to the force torque considered. Thus, three optimised value ranges 28, 30, 32 relating respectively to the three pairs 'B1, CR1'; 'B2, CR2'; 'B3, CR3' are obtained. The pairs are formed such that each of the three optimised value ranges 28, 30 and 32 is at least partially superimposed with another of these three optimised value ranges, and so that a minimum of the three optimised value ranges is greater than a minimum value of the three continuous classification parts, that is to say of the range of values 26, and that a maximum value of these three optimised value ranges is less than a maximum value of the three continuous classification parts, that is to say of the range of values 26, as shown in FIG. 4. In addition, the three pairs are formed so that each of the three corresponding optimised value ranges 28, 30 and 32 has a minimum value which is greater than the minimum value $K_u^{min}$ of the range of values 25 which gives the functional and therefore 'authorised' values for the magnetic coupling factor.

In practice, the first continuous classification part determining the first class of rotors CR1 corresponds to a lower part of the range of values 26 where the values of the magnetic coupling factor are less than the target value $K_u^{tar}$; the second continuous classification part determining the second class of rotors CR2 corresponds to a middle part of the range of values 26 where the values of the magnetic coupling factor are located around the target value $K_u^{tar}$; and the third continuous classification part determining the third class of rotors CR3 corresponds to an upper part of the range of values 26 where the values of the magnetic coupling factor are greater than the target value $K_u^{tar}$. The coils B1 of the first plurality of coils associated with the first class of rotors CR1 have a number of turns of the electrical wire constituting them which is greater than a reference number $NB_{Ref}$ provided for the reference coils of the reference stator. The coils B2 of the second plurality of coils associated with the second class of rotors CR2 have a number of turns of the electrical wire constituting them which is equal to said reference number. These coils B2 are therefore reference coils $B_{Ref}$. It will be noted that this case is advantageous when the number of classes of rotors and therefore the number of pairs provided is an odd number. The coils B3 of the third plurality of coils associated with the third class of rotors CR3 have a number of turns of the electrical wire constituting them which is less than said reference number. In an advantageous variant wherein the range of values 26 is divided into three continuous parts of substantially equal length, the number of turns NB1 of the electric wire of each coil B1 is equal to the reference number $NB_{Ref}$ to which an optimisation number $NB_{opt}$ is added, that is to say $NB1=NB_{Ref}+NB_{opt}$, the number of turns NB2 of the electric wire of each coil B2 is equal to the reference number $NB_{Ref}$, and the number of turns NB3 of the electric wire of each coil B3 is equal to the reference number $NB_{Ref}$ from which the optimisation number $NB_{opt}$ is subtracted, that is to say $NB3=NB_{Ref}-N_{Bopt}$.

Finally, the assembly step is carried out by assembling the rotors of each class of rotors with a stator formed by two coils of the associated plurality of coils with which this class of rotors forms one of the three pairs 'B1, CR1'; 'B2, CR2' and 'B3, CR3', that is to say so that all the generators of the N groups of generators constituting the plurality of generators obtained have a magnetic coupling factor $K_u$ which is located in a global optimised range $PG_{opt}$, referenced 34, which is comprised entirely within the range of values 25 ensuring normal operation for the plurality of assemblies formed respectively of the plurality of generators and of a plurality of electronic regulation circuits. The overall optimised range 34 is therefore comprised within the range of values 26 and also within the range of values 25.

In a preferred variant corresponding to the advantageous variant described, the three pluralities of coils are provided and the three 'plurality of coils and associated class of rotors' pairs are formed so that each of the three optimised value ranges is at least partially superimposed with every other optimised value range (see FIG. 4). In an optimal variant, the optimised value ranges are perfectly aligned so that the optimised overall range $PG_{opt}$ corresponds to the optimised value ranges which are identical.

The invention claimed is:

1. A method for manufacturing a plurality of permanent magnet generators adapted for a horological application wherein each generator is rotated by a watch mechanism driven by a source of mechanical energy and where each generator power supplies an electronic circuit operating in a given power supply voltage range, said method comprising a step of manufacturing coils, a step of manufacturing rotors, and then a step of assembling a plurality of stators, each formed of a given number of coils manufactured during the step of manufacturing coils, respectively with a plurality of rotors, manufactured during the step of manufacturing rotors, to obtain the plurality of generators; the step of manufacturing rotors being carried out, with given tolerances, on the basis of data defining a reference rotor; wherein the step of manufacturing coils comprises manufacturing N pluralities of coils, similar within the same plurality and different from one plurality to another, N being an integer greater than one (N>1); in that, before said step of assembling the plurality of stators with the plurality of rotors, a step of classifying the rotors of the plurality of rotors into N classes of rotors is carried out, the rotors of each of the N classes of rotors being selected so that they have a magnetic coupling factor with a reference stator, formed with said given number of reference coils placed in a reference configuration relative to each rotor, which is located within a continuous classification value range which is not superimposed on the continuous classification value ranges of other rotor classes; in that the N pluralities of coils are associated respectively with the N classes of rotors, thus forming N 'plurality of coils and associated class of rotors' pairs, so that the rotors of each class of rotors each have a magnetic coupling factor with a corresponding stator, formed of said given number of coils of the plurality of coils associated with the considered class of rotors, which is located in an optimised value range among N optimised value ranges relating respectively to the N pairs, each of the N optimised value ranges being at least partially superimposed with another of these N optimised value ranges; so that a minimum value of the N optimised value ranges is greater than a minimum value of the continuous classification value ranges and that a maximum value of these N optimised value ranges is less than a maximum value of the continuous classification value ranges; and so that the N optimised value ranges lie within a range of values for the magnetic coupling factor corresponding to the given power supply voltage range; and wherein said assembly step is carried out by assembling the rotors of each class of rotors with a stator formed by said given number of coils of the associated plurality of coils with which said class of rotors forms one of said N pairs.

2. The method for manufacturing a plurality of generators according to claim 1, wherein the N pluralities of coils are provided and the N 'plurality of coils and associated class of rotors' pairs are formed so that each of the N optimised value ranges is at least partially superimposed with every other optimised value range.

3. The method for manufacturing a plurality of generators according to claim 1, wherein said number N is an odd number and one of the N 'plurality of coils and associated class of rotors' pairs is formed of a plurality of reference coils.

4. The method for manufacturing a plurality of generators according to claim 1, wherein said mechanism comprises an analogue time display and said electronic circuit is a circuit for regulating the speed of rotation of an associated generator which is manufactured according to said method.

* * * * *